G. S. ACKLEY.
BRAKE MECHANISM.
APPLICATION FILED AUG. 23, 1909.
983,596.
Patented Feb. 7, 1911.
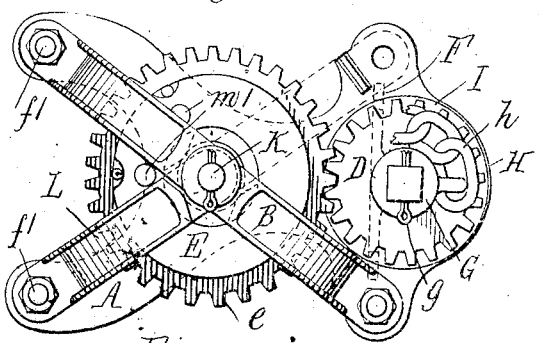
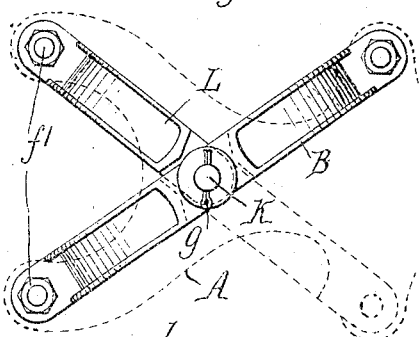
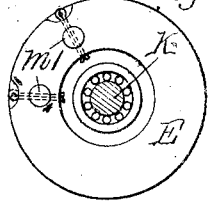
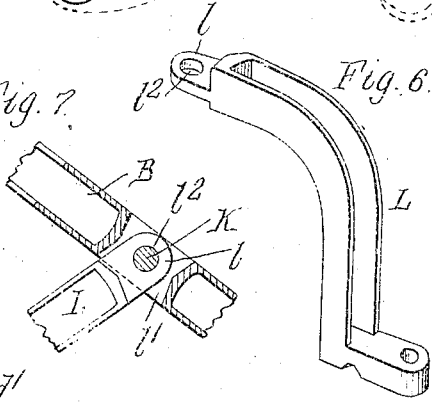
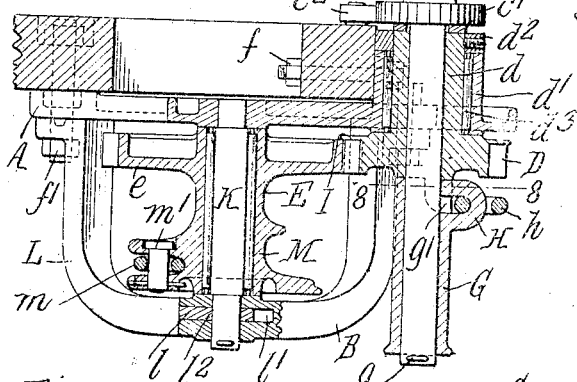
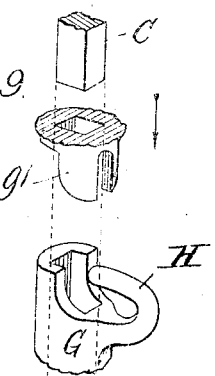
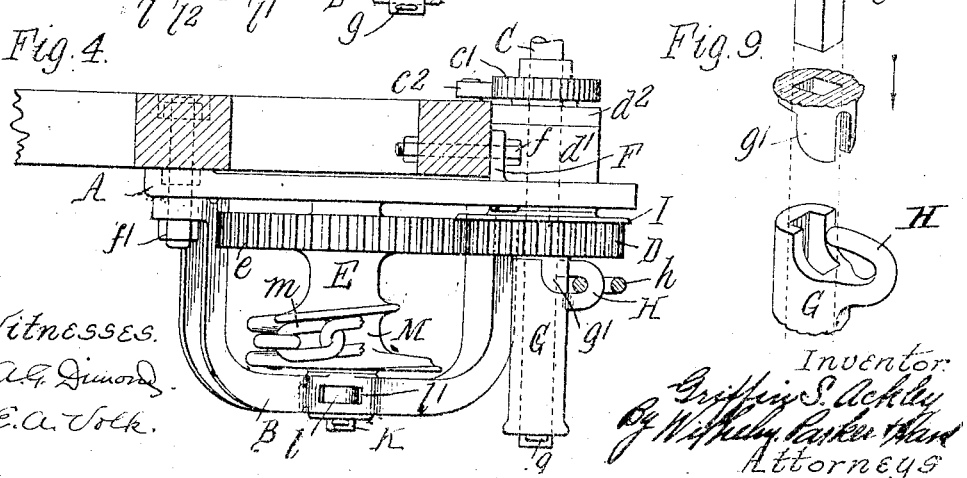

UNITED STATES PATENT OFFICE.

GRIFFIN S. ACKLEY, OF BUFFALO, NEW YORK, ASSIGNOR TO NATIONAL BRAKE COMPANY, OF BUFFALO, NEW YORK.

BRAKE MECHANISM.

983,596.

Specification of Letters Patent. Patented Feb. 7, 1911.

Application filed August 23, 1909. Serial No. 514,204.

*To all whom it may concern:*

Be it known that I, GRIFFIN S. ACKLEY, a citizen of the United States, residing at Buffalo, in the county of Erie and State of New York, have invented a new and useful Improvement in Brake Mechanisms, of which the following is a specification.

This invention relates more particularly to that type of brake mechanisms for cars in which a hand actuated brake staff is geared to and rotates a chain drum having a spiral-like periphery upon which the chain is wound. A brake mechanism of this character is shown in Letters Patent No. 910,633, granted to me on January 26, 1909, in which, among other things, the supporting frame for the chain drum comprises a horizontal base which is fastened to the underside of the car floor, and a U-shaped yoke which is adjustable to different positions on the base to adapt the mechanism to cars of different construction, and in which one end of the chain drum is journaled.

One object of this invention is to provide an adjustable brace for this yoke which can be secured in different positions upon the base, as may be required according to the adjustment of the yoke to rigidly hold the yoke and winding drum in position on the base.

A further object of the invention is to provide a chain winding drum in which the spiral-like periphery upon which the chain is wound is of decreasing radius from the bottom to the top of the drum, the chain being secured near the large lower end thereof and being wound in coils, one above the other, upon the drum. Each coil thus tends to support the one next above it and prevents the chain from slipping down out of its proper position upon the drum, as frequently happens in mechanisms in which the chain is wound downwardly upon a drum which decreases in radius from the top to the bottom thereof.

Further objects of the invention are to provide means whereby the auxiliary brake chain, which is employed for operating the brake in case of accident to the main brake chain or its winding drum, can be readily attached to the brake staff; to provide a supporting base for the brake mechanism which can be easily secured to the end of the floor frame of the car; and to otherwise simplify and improve the construction of brake mechanisms as hereinafter more fully set forth and described.

In the accompanying drawings: Figure 1 is a bottom plan view of a brake mechanism embodying the invention. Fig. 2 is a bottom plan view of the winding drum. Fig. 3 is a sectional elevation of the brake mechanism. Fig. 4 is a side elevation thereof. Fig. 5 is a bottom plan view of the adjustable yoke and brace, showing a different position thereof. Fig. 6 is a perspective view, on an enlarged scale, of the brace detached. Fig. 7 is a fragmentary section of the yoke and brace connection. Fig. 8 is a cross section, on an enlarged scale, of the brake staff and winding spindle in line 8—8, Fig. 3. Fig. 9 is a fragmentary perspective view of the brake staff, pinion and winding spindle in detached position.

Like reference characters refer to like parts in the several figures.

The brake mechanism in its general arrangement and construction is the same as that shown in my Patent No. 910,633 and comprises the base plate A, the adjustable U-shaped yoke B, the upright brake staff C having the usual hand crank $c$ at its upper end and ratchet wheel $c'$ and dog $c^2$ near its lower end, the pinion D which is secured to the lower end of the brake staff, and the winding drum E, for the main brake chain, which has a toothed portion $e$ which meshes with the pinion D so that the winding drum is turned and the main brake chain wound thereon by turning the staff. The pinion D is suitably journaled in the base plate A, having, in the construction shown, an integral hollow sleeve $d$ which is journaled in a hollow bearing boss $d'$ on the base plate, in which it is retained by a collar $d^2$. A roller bearing $d^3$ is interposed between the pinion sleeve and the bearing boss. The sleeve $d$ is preferably provided with a square hole and the lower end of the brake staff is squared and extends through this hole.

The base A is adapted to be secured to the underside of the floor frame of the car at the front end thereof and is provided with a lug F which projects upwardly from the base adjacent to the rear side of the bearing boss $d'$ and is secured to the front end of the car end-sill by bolts $f$. At its rear corners the base A is secured to the car by bolts $f'$ or in any other suitable manner. This construction, is particularly adapted to cars in which it is necessary, by reason of the construction of the car, to have the brake staff arranged in advance of the front end of the car floor or frame.

An auxiliary brake chain is secured to the lower end of the brake staff so that, in case of accident to the main brake chain or its winding mechanism, the auxiliary chain can be used for applying the brake, and for this purpose the following means are employed: The lower end of the brake staff C extends below the pinion D and is provided with a detachable winding spindle or sleeve G which fits over the square end of the staff, against the underside of the pinion and is preferably secured thereon by a cotter pin $g$ in the end of the staff. The pinion has a slotted lug $g'$ depending from the underside thereof and the upper end of the spindle G is cut away at one side to receive this lug. A hook H extends laterally from the spindle G and is adapted to receive the end link of the auxiliary chain $h$. The hook H is turned inwardly, so that when the spindle is in place upon the brake staff, the slotted lug $g'$ on the pinion will embrace and rigidly hold the end of the hook, thus preventing the hook from being twisted by the pull of the chain and also closing the open end of the hook and preventing the disengagement of the chain $h$ therefrom. The engagement of the lug $g'$ of the pinion in the cut-away portion of the spindle locks the parts together and supplements the staff in preventing relative rotation between the pinion and the spindle, thereby greatly strengthening the construction. The chain can only be detached from the hook H by removing the spindle from the brake staff.

The auxiliary chain is of such length that when the brake staff is turned, the winding drum is actuated to apply the brake through the main brake chain, and the auxiliary chain only acts to apply the brake in case the main brake chain or its drum is broken, by continuing the rotation of the brake staff.

The pinion D is preferably provided on its upper side with an annular flange I which overhangs the teeth $e$ of the drum E at the point where the same intermesh with the teeth of the pinion and serves to prevent the pinion from slipping down on the brake staff out of mesh with the teeth of the drum in case the pinion becomes loose on the staff.

The drum E, as in the patented construction, is journaled on a stud axle K which fits loosely at its lower end in a hole in the yoke B so that the yoke can be adjusted to different positions on the base or removed from the axle to permit the drum to be slipped off of the same. The yoke serves to hold the stud axle and its drum in position upon the base and braces the same against the strain of the brake chain.

To further strengthen the construction and hold the stud axle of the drum perfectly rigid notwithstanding excessive strain which it may receive, a detachable brace L is provided which is adapted to be bolted at one end to the base A at one of the corners thereof, and is provided at its other end with a reduced end portion $l$ which is adapted to enter a slot $l'$ in the yoke B and has a hole $l^2$ through which the end of the stud axle K passes.

The yoke B can be adjusted upon the base A to either of the diagonal positions shown in Figs. 1 and 5, so that it will accommodate itself to the construction of the car and the position of the base thereon, and the brace L may likewise be adjusted in accordance with the position of the yoke, to either of the positions shown in Figs. 1 and 5, in which it acts as a brace to the stud axle and yoke against the pull of the brake chain, or it may be secured to the front end of the base in either of the positions indicated by broken lines in Figs. 1 and 5 and act as a stay for the stud axle. The bolts which secure the rear end of the base to the floor or frame of the car may be used for securing the end of the brace to the base when the brace extends rearwardly from the stud axle.

The drum E has a large helical portion M at one end of greater radius than the remainder of the drum, and the drum is arranged in the frame with the large end lowermost, the chain $m$ being secured to this large lower end, preferably by one or more bolts $m'$ which have their heads countersunk in a flanged portion of the drum so as not to interfere with the winding of the chain upon the drum. In turning the drum to apply the brake, the chain $m$ is wound upwardly around the drum and each winding of the chain tends to support the winding next above it and to hold the chain in place upon the drum while being wound. This prevents the chain from slipping downwardly on the drum, as frequently happens in drums which are arranged with their large ends uppermost.

I claim as my invention:

1. In a brake mechanism, the combination of a winding drum, a frame on which the same is journaled comprising a base adapted to be secured to the car, a yoke for the drum journal, means for rigidly securing said yoke in different relations to said base, and a brace for the yoke which is adjustable to different positions relative to said yoke and said base, substantially as set forth.

2. In a brake mechanism, the combination of a winding drum, a frame on which the same is journaled comprising a base adapted to be secured to the car, a yoke which is secured at its ends to the base and is adjustable to different positions relative thereto, and between the ends of which the drum is journaled, and a brace which is pivotally connected at one end to the yoke intermediate of the ends thereof and is adapted to be secured at its other end in different positions upon the base, substantially as set forth.

3. In a brake mechanism, the combination of a winding drum, a frame adapted to be secured to the car and comprising a base in which the drum is journaled at one end and a yoke in which the drum is journaled at its opposite end, means for securing the yoke in different positions upon the base, a brace for the yoke, one end of which is pivoted to the journal at one end of the drum, and means for securing the other end of the brace to the base in different positions thereon, substantially as set forth.

4. In a brake mechanism, the combination of a frame comprising a base adapted to be secured to the car and having an integral bearing boss which projects above said base, and a depending yoke which is secured at its ends to said base, a winding drum having a spiral-like periphery which is journaled at its opposite ends in said base and said yoke and is arranged between the same with its larger end lowermost, a pinion which is journaled in said bearing boss and is geared to the upper end of said winding drum beneath said base, and a chain which is secured to the large lower end of said drum and is adapted to be wound upwardly thereon, substantially as set forth.

5. In a brake mechanism, the combination of a brake staff, a chain spindle secured on said staff and provided with a hook for the attachment of the brake chain, and a part on the staff embracing the end of the hook to hold the same rigid, substantially as set forth.

6. In a brake mechanism, the combination of a brake staff, a chain spindle secured on said staff and provided with a hook for the attachment of the brake chain, and a part on the staff having interlocking engagement with the spindle and embracing the end of the hook to lock said part and spindle together and hold the hook rigid, substantially as set forth.

7. In a brake mechanism, the combination of a chain winding drum, a brake staff, a pinion on said staff geared to said drum, a chain spindle on said staff, a chain-attaching hook on one of the parts on said brake staff, said other part on the brake staff having a portion which embraces said hook to hold the same rigid, substantially as set forth.

8. The combination with the floor frame of a car, of brake mechanism comprising a drum, an operating staff for the drum, a supporting frame arranged under the floor frame and provided with a bearing for the staff which projects upwardly beyond the end of the floor frame, and means for securing said supporting frame to the front end of said floor frame, substantially as set forth.

Witness my hand, this 18th day of August, 1909.

GRIFFIN S. ACKLEY.

Witnesses:
E. C. HURD,
C. B. HORNBECK.